United States Patent [19]

Van Dijck

[11] Patent Number: 5,002,716
[45] Date of Patent: Mar. 26, 1991

[54] JOINING INSULATED ELONGATE CONDUIT MEMBERS

[75] Inventor: Frans S. J. Van Dijck, Swindon, United Kingdom

[73] Assignee: Raychem Corporation, Menlo Park, Calif.

[21] Appl. No.: 349,886

[22] Filed: May 5, 1989

Related U.S. Application Data

[63] Continuation of Ser. No. 112,005, Oct. 20, 1987, abandoned, which is a continuation of Ser. No. 797,608, Nov. 13, 1985, abandoned.

[30] Foreign Application Priority Data

Nov. 14, 1984 [GB] United Kingdom ................. 8428815
Jun. 27, 1985 [GB] United Kingdom ................. 8516476

[51] Int. Cl.⁵ ...................... B29C 41/00; F16L 59/00
[52] U.S. Cl. ............................ 264/230; 264/DIG. 71;
285/381; 285/47
[58] Field of Search .................... 285/47, 48, 50, 54,
285/55, 331, 381, 909; 156/86; 138/149;
174/DIG. 8; 264/230, 36, DIG. 71 X

[56] References Cited

U.S. PATENT DOCUMENTS

| 2,027,962 | 1/1936 | Currie | 18/55 |
| 2,182,995 | 12/1939 | Pepper et al. | 285/331 |
| 2,729,873 | 1/1956 | Ludwig | 285/383 |
| 2,857,931 | 10/1958 | Lawton | 138/149 |

(List continued on next page.)

FOREIGN PATENT DOCUMENTS

| 2041807B | 11/1977 | Fed. Rep. of Germany . | |
| 3203728A | 8/1983 | Fed. Rep. of Germany . | |
| 3303029 | 8/1984 | Fed. Rep. of Germany | 285/381 |
| 215141 | 10/1984 | Fed. Rep. of Germany | 138/149 |
| 3512674 | 10/1985 | Fed. Rep. of Germany | 285/47 |
| 632329 | 9/1982 | Switzerland | 285/47 |
| 291644 | 6/1928 | United Kingdom | 285/47 |
| 1327441 | 8/1973 | United Kingdom . | |
| 1327442 | 8/1973 | United Kingdom . | |
| 1337546 | 11/1973 | United Kingdom . | |
| 1357471 | 6/1974 | United Kingdom . | |
| 1421481 | 1/1976 | United Kingdom . | |
| 1435695 | 5/1976 | United Kingdom . | |
| 1488393 | 10/1977 | United Kingdom . | |
| 1518788 | 7/1978 | United Kingdom . | |
| 2039654 | 8/1980 | United Kingdom . | |
| 2042819B | 9/1980 | United Kingdom . | |
| 1579152 | 11/1980 | United Kingdom . | |
| 2073837 | 10/1981 | United Kingdom | 285/47 |
| 2108625B | 5/1983 | United Kingdom . | |

OTHER PUBLICATIONS

Nasa Publication SP110, "55-Nitinol-The Alloy with a Memory, etc.", (U.S. Government Printing Office, Washington, D.C. 1972).
N. Nakanishi et al., Scripta Metallurgica, pp. 433–440 (Pergamon Press 1971).
E. Emanui et al., Scripta Metallurgica, pp. 663–667 (Pergamon Press 1971).
European Patent Application No. 85302326.5, Date 3/12/85.
Great Britain Patent Application No. 2,108,625A, Date 5/18/83.
Great Britain Patent Application 2,076,918A, Date 12/9/81.
Great Britain Patent Application 2,135,005A, Date 8, 1984.

Primary Examiner—Eric K. Nicholson
Attorney, Agent, or Firm—Edith A. Rice; Herbert G. Burkard

[57] ABSTRACT

The invention relates to joining insulated elongate conduit members, such as thermally insulated pipes. A pipe (1) is provided with thermal insulation (2), in which, at an end of the pipe, there is an annular recess (6) such that an end portion (4) of the pipe is exposed to allow access for connection thereto. To make a connection, a recoverable connecting collar is positioned at least partially within the recess, and allowed to recover into gripping engagement with the exposed portion of the pipe. The invention obviates the necessity of reinsulating the joint region of an insulated pipe.

4 Claims, 3 Drawing Sheets

U.S. PATENT DOCUMENTS

| | | | |
|---|---|---|---|
| 3,035,113 | 5/1962 | Danchuk | 285/909 |
| 3,086,242 | 4/1963 | Cook et al. | 18/1 |
| 3,174,851 | 3/1965 | Buehler et al. | 75/170 |
| 3,351,463 | 11/1967 | Rozner et al. | 75/170 |
| 3,369,826 | 2/1968 | Boosey et al. | 138/149 |
| 3,563,572 | 2/1971 | French | 138/149 |
| 3,597,372 | 8/1971 | Cook | 260/4 |
| 3,677,303 | 7/1972 | Martin | 138/149 |
| 3,711,124 | 1/1973 | Gerholt et al. | 285/47 |
| 3,744,823 | 7/1973 | Muir et al. | 285/381 |
| 3,753,700 | 8/1973 | Harrison et al. | 75/175.5 |
| 3,759,552 | 9/1973 | Levinsohn et al. | 285/175 |
| 3,765,705 | 10/1973 | Tantam | 285/47 |
| 3,783,037 | 11/1970 | Brook et al. | 148/11.5 |
| 3,929,166 | 12/1975 | Westerheid | 138/149 |
| 3,992,237 | 11/1976 | Gerholt et al. | 138/149 |
| 4,019,925 | 4/1977 | Nenno et al. | 148/2 |
| 4,025,091 | 5/1977 | Zeile, Jr. | 138/149 |
| 4,054,158 | 10/1977 | Hofman et al. | 285/47 |
| 4,084,842 | 4/1978 | Stonitsch et al. | 285/47 |
| 4,092,193 | 5/1978 | Brooks | 285/381 |
| 4,144,104 | 3/1979 | Brooks | 148/11.5 |
| 4,146,392 | 3/1979 | Brooks | 75/161 |
| 4,166,739 | 9/1979 | Brooks | 75/157.5 |
| 4,219,225 | 8/1980 | Sigmund | 285/47 |
| 4,332,401 | 6/1982 | Stephenson et al. | 285/47 |
| 4,340,245 | 7/1982 | Stalder | 138/149 |
| 4,400,019 | 8/1983 | Fruck | 285/383 |
| 4,434,320 | 2/1984 | Klein et al. | 174/DIG. 8 X |
| 4,441,743 | 4/1984 | Steenbergen | 285/21 |
| 4,467,002 | 8/1984 | Crofts | 174/DIG. 8 X |
| 4,576,666 | 3/1986 | Harris et al. | 285/381 |
| 4,624,879 | 11/1986 | Van Dijck et al. | 285/381 |
| 4,629,216 | 12/1986 | Pedersen | 285/47 |
| 4,660,861 | 4/1987 | Argy et al. | 285/381 |

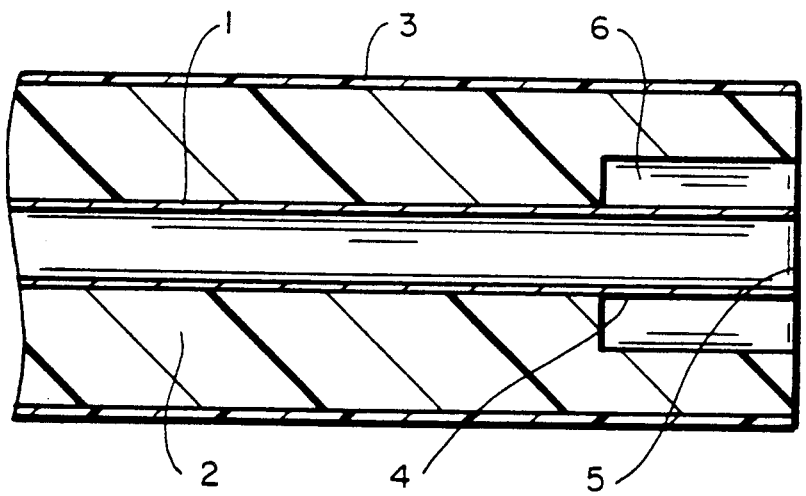
FIG_1
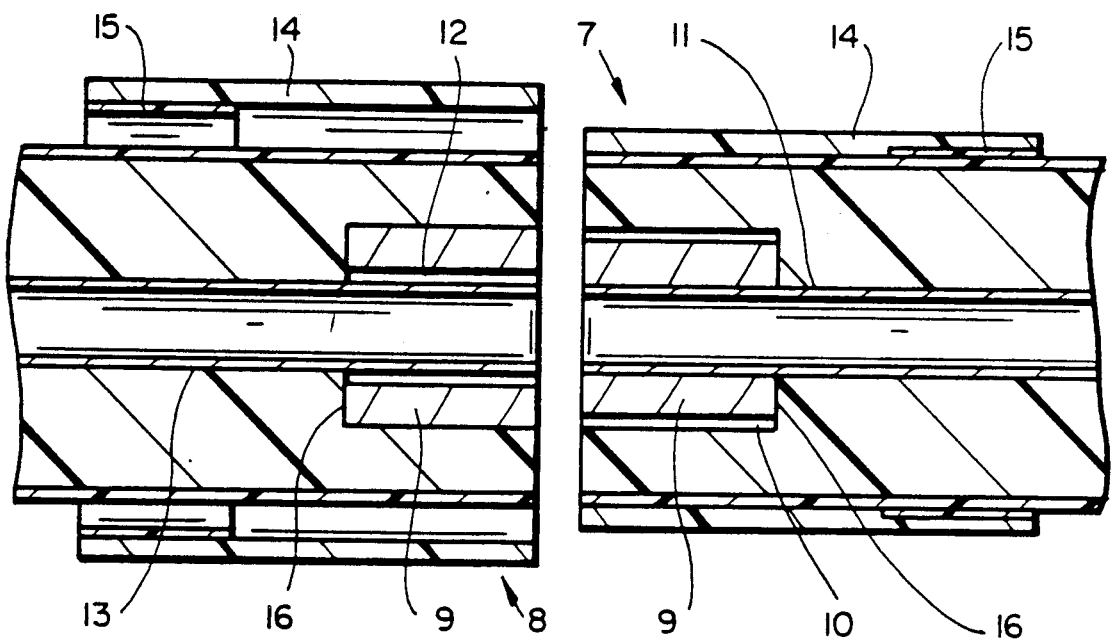
FIG_2A  FIG_2B

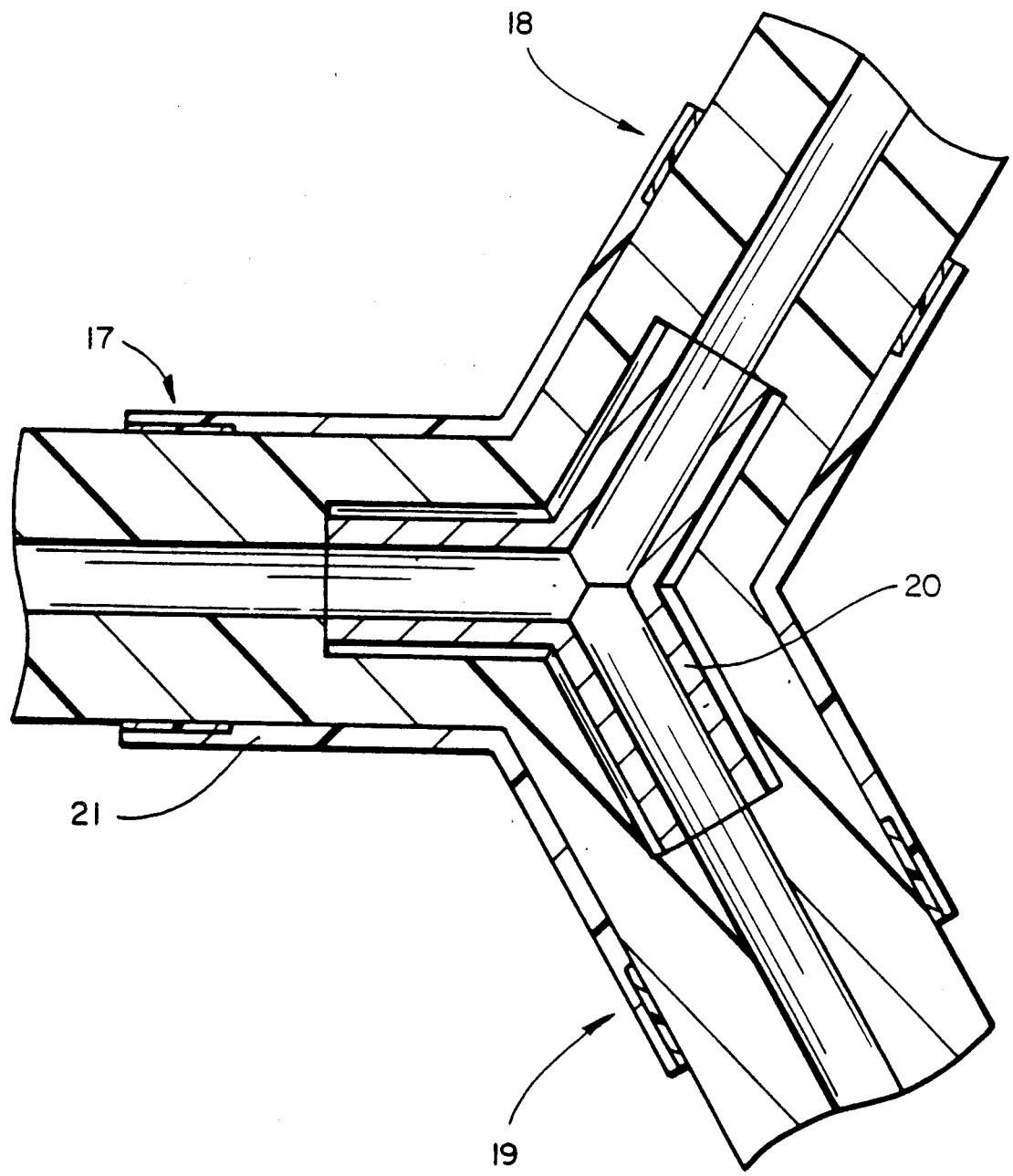
FIG_3

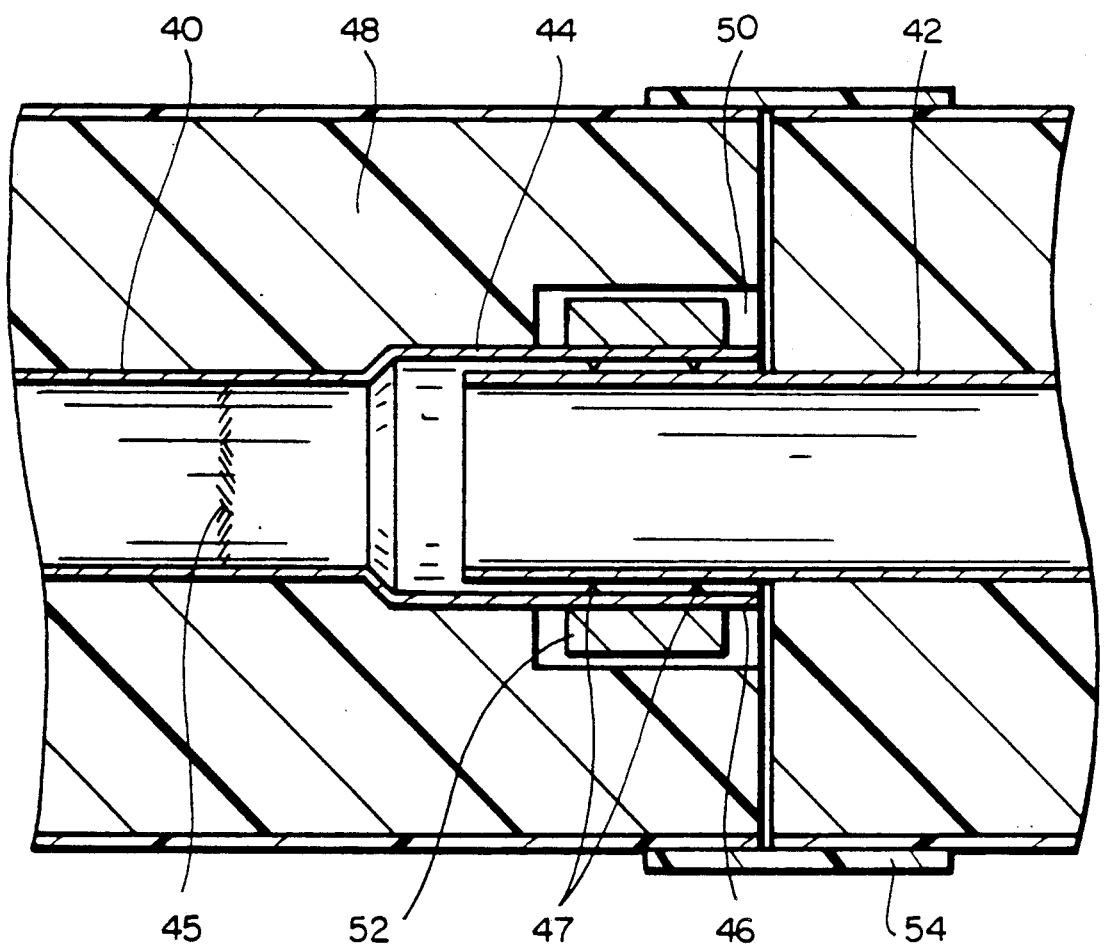
FIG_4

JOINING INSULATED ELONGATE CONDUIT MEMBERS

This application is a continuation of application Ser. No. 07/112,005, filed Oct. 20, 1987, now abandoned which is a continuation of application Ser. No. 797,608, filed Nov. 13, 1985, now abandoned.

BACKGROUND OF THE INVENTION

This invention relates to an insulated elongate conduit member and an assembly therefor, and a method of joining insulated elongate conduit members. The invention is particularly but not exclusively suitable for joining insulated pipes. Although the invention relates in general to the joining of insulated elongate conduit members, the description below will relate primarily, for convenience and not by way of limitation, to the joining of thermally insulated pipes, suitable for use in a district heating system, or a district cooling system.

In the installation of insulated pipes comprising a fluid conveying pipe, and a covering layer of thermal insulation, it is necessary to make joints between adjacent sections of pipe. After joining the pipes, it is necessary to ensure that there is adequate thermal insulation around the joint in order to minimise heat losses from the system.

Hitherto, the end portion of an insulated pipe has been bared of insulation to facilitate joining to the bared end portion of another insulated pipe by for example welding, brazing or soldering. It is then necessary to reinsulate the bared pipes in the region of the joint. One method that has been used to reinsulate the bare portion of the pipes is to position a tubular case around said bare portion, introduce insulating foam to fill the cavity surrounding the bare portion through an opening in the case, and then provide an environmental sealing layer, of for example heat-recoverable polymeric material, around the case. One major disadvantage, however, is that a different size case must be provided for each different sized insulated pipe; this means that a large inventory must be carried. Another problem is that the introduction of foam into the cavity within the case around the pipe joint does not always lead to a well insulated joint, and the foaming process itself is potentially hazardous to the operator. Yet another problem is that the method described above is time-consuming.

A further problem lies in the vulnerability of the bare ends of insulated pipes to damage before installation, which can result in a pipe being substantially weakened, or deformed to an extent that it cannot be joined to the end of another pipe.

The present invention provides an insulated elongate conduit member, which is arranged so that connection to the member or inter-connection of two such members, may be effected in a particularly convenient manner, without subsequently having to create a layer of insulation around the connection.

Accordingly, in one aspect, the present invention provides an elongate conduit member covered with insulating material, wherein at at least one end of the member, the insulating material is provided with an annular recess surrounding the member thereby exposing a portion of the member at the said end, to allow access for connection thereto.

The invention is applicable to, inter alia thermally insulated pipes, for example pipes carrying water, including district heating pipes and district cooling pipes, or pipes carrying oil products. The invention is applicable inter alia to preinsulated metal pipes, and to preinsulated polymeric pipes, for example preinsulated polyethylene pipes. Preferably the end of the conduit member and the end of the insulating material are substantially coplanar, or at least they are arranged such that the conduit member does not extend beyond the end of the insulation material.

The insulated elongate conduit member is preferably provided with a connecting collar adapted to fit the annular recess, for example, a recoverable tubular connecting collar, for effecting connection to the member and, for example, another of said elongate conduit members.

In its second aspect, the invention provides an assembly comprising at least two insulated elongate conduit members, wherein at at least one end of each insulated member, the insulating material is provided with an annular recess surrounding the member, thereby exposing the end of the member to allow access for connection thereto; and at least one recoverable tubular connecting collar suitable for effecting interconnection of said ends of said members, and adapted to be located within the annular recesses surrounding said ends.

DESCRIPTION OF PREFERRED EMBODIMENTS

The present invention also provides a method of connecting an insulated elongate conduit member in which at least one end of said member, the insulating material is provided with an annular recess surrounding the member, thereby exposing a portion of the member at the said end to allow access for connection thereto, the method comprising positioning a recoverable connecting collar within the annular recess such that it surrounds the exposed end portion of the elongate member, and recovering the collar into connecting engagement with the exposed end portion.

The method of the invention may be used, for example, to interconnect insulated elongate conduit members, such as insulated pipes, or to connect an insulated pipe to an outlet on the central boiler or refrigerator of a district heating system or a district cooling system respectively.

By a recoverable article is meant an article whose dimensional configuration may be made to change when subjected to an appropriate treatment. Usually these articles recover towards an original shape from which they have previously been deformed but the term "recoverable", as used herein also includes an article which adopts a new configuration, even if it has not been previously deformed. The article may be heat recoverable, such that its dimensional configuration may be made to change when subjected to heat treatment.

The term "tubular", as used herein to describe a recoverable member, includes both right circular cylindrical hollow members, and also members of irregular and/or of varying cross-section as well as, for example, members of Y-shaped, T-shaped and X-shaped cross-section.

The recoverable tubular connecting collar may comprise metallic and/or polymeric material. Recoverable metals are often referred to as "memory metals" or "memory alloys" and are metallic materials which exhibit changes in strength and configurational characteristics on passing through a transition temperature, in most cases the transition temperature between the martensitic and austenitic states, and can be used to make heat recoverable articles by deforming an article made from them whilst the metal is in its martensitic, low temperature state. The article will retain its deformed configuration until it is warmed above the transition temperature to the austenitic state when it will return or attempt to return towards its original configuration. It will be understood that the heat-recoverable article is capable of returning towards its original configuration without the further application of outside forces.

Amongst such memory metals there may especially be mentioned various alloys of titanium and nickel which are described, for example in U.S. Pat. Nos. 3,174,851, 3,351,463, 3,753,700, 3,759,552, British Patent Nos. 1327441 and 1327442 and NASA Publication SP 110, "55-Nitinol - The Alloy with a Memory, etc." (U.S. Government Printing Office, Washington, D.C. 1972). The property of heat-recoverability has not however, been solely confined to such as titanium-nickel alloys. Thus, for example, various beta-brass alloys have been demonstrated to exhibit this property in, e.g. N. Nakanishi et al *Scripta Metallurgica* 5 433–440 (Pergamon Press 1971), U.S. Pat. Nos 3,783,037, 4,019,925, 4,144,104, 4,146,392 and 4,166,739, and such materials may be doped to lower their transition temperature to cryogenic regimes by know techniques. Similarly, 304 stainless steels have been shown to enjoy such characteristics E Enami et al, id, at pp. 663–68.

The use of a collar comprising memory metal to effect interconnection of the elongate conduit members of the invention has the advantage that the operator sensitive process of, for example welding is avoided. Advantageously, the collar comprises a nickel-titanium alloy, which exerts a particularly large recovery force.

Examples of connecting collars comprising at least in part memory metal and which are suitable for connecting to elongate members of the present invention, are described in UK Patent Nos. 1327441, 1488393, 1518788 and 2039654B. These specifications describe connecting collars which incorporate various gripping means, for example, a tubular collar may be provided with circumferential inwardly projecting teeth on its inner surface, or with a liner, itself provided with teeth. A layer of a sealant, having dispersed therein a particulate filler which is adapted to bite into the elongate member on recovery of the recoverable collar may be located inside the collar. An alternative form of connecting collar is described in UK published Patent application No. 2042819A, which comprises a substantially tubular insert, positioned within at least one recoverable driver, and arranged to receive the ends of the elongate members to be connected within it. The connecting collar described in the above-mentioned specifications are referred to by way of example only, and not by way of limitation. It is to be understood that other forms of recoverable connecting collars may be used in the present invention.

In another embodiment, the recoverable tubular connecting collar comprises a recoverable polymeric material. Preferably a conductive polymeric material is used, which can be heated to its recovery temperature by passing electric current through the polymer. By appropriate electroding the current can be caused to flow between the ends of the conductive polymeric collar, or alternatively, through the thickness of the collar. Preferably the polymeric material is sintered. It is particularly preferred to use a collar comprising sintered ultra high molecular weight polyethylene, preferably having carbon black dispersed therein. The polymeric material may, but need not necessarily, be cross-linked. Suitable polymeric collars, and use thereof, are disclosed in European patent application Mo. 85302326.5.

The polymeric collar is preferably arranged to adhere directly or indirectly to the insulation-free end portion of the or each elongate conduit member, to effect interconnection of the conduit members.

It is particularly advantageous to use a collar comprising recoverable polymeric material for joining conduit members that are made of a material that is fusible with the polymeric material of the collar. Thus, for example, it is particularly advantageous to use a polymeric collar to join polymeric conduit members, for example polyethylene pipes. In such cases the recoverable collar is preferably heated to its recovery temperature to cause the collar to recover to contact the conduit members; heating is then continued to cause fusion between the collar and the conduit members.

In a preferred embodiment, the outside of the recoverable collar slidingly engages the longitudinally extending surface of the insulating material which defines the recess. For example, in the case of an insulated pipe with an external diameter of 20 cm in which the conduit has an external diameter of 7.5 cm, the diameter of the recess, and also of a recoverable collar with a wall thickness of 0.4 cm, prior to recovery, is preferably in the range of 8.6 to 8.9 cm while after recovery, the outer diameter of the collar will be 8.3 cm. Thus, the space between the collar and said surface after recovery of the collar is relatively small, and the insulation around the completed joint is substantially the same as that around the remainder of the conduit.

In addition, in the case of a joint between two elongate conduit members the axial length of the annular recess is substantially equal to half the axial length of the recoverable collar. This arrangement has the advantage that the collar can be positively axially engaged within the recesses around the two conduit members which are to be jointed thereby minimising the chance of a bad joint caused by a misplaced collar. In addition, this arrangement has the advantage that conduit members are brought into abutting contact, so that there is no space remaining between the insulation of the joined members. It is preferred that there is a recess in the insulation at each end of a conduit member to enable a connection, for example an inter-connection, to be made at each end of said member.

In an alternative embodiment, the connection may be effected by means of one or more recoverable connecting collars in conjunction with a deformable tubular connecting member. In use, the connecting member is placed around an end of a conduit member to be joined within the annular space in the insulation, and the recoverable collar is placed around the connecting member and the conduit member such that, on recovery of the collar, the connecting member is deformed inwardly into sealing engagement with the underlying conduit member. The deformable connecting member may be joined, at another end, to another conduit member by means of another recoverable collar. Alternatively or in addition, the conduit member of the invention may comprise, at at least one end, a connecting member which is arranged to receive an end portion of another conduit member, for example the connecting member may be connected to a conduit member, for example, by welding or by means of an adhesive, or the connecting member may be formed as a swaged end portion of the conduit member, within which the end portion of another conduit member can be positioned prior to inward deformation of the swaged end portion by a recoverable collar. When a deformable connecting member is used, it may comprise metallic or polymeric material. The connecting member will generally have a cylindrical cross-section, and it may be straight or have an X, Y, T or other to suit the pipe configuration. The connecting member may be provided with teeth, an adhesive liner or another adaptation to enhance its ability to seal to the underlying conduit. It is particularly preferred to use, as a connecting member, a steel tube which can be welded at one end to an elongate conduit member, and deformed at another end into sealing engagement with another conduit member.

When the present invention provides a joint, for example between two elongate conduit members, it will be appreciated that the joint between the members is well insulated by the original insulating material, which additionally provides a smooth profile on to which an outer protecting cover may be applied. Thus the process of introducing insulating material into a cavity around the joint, being time-consuming, operator sensitive and potentially hazardous, may be completely avoided.

In a preferred embodiment of a joint provided by the present invention, the insulation in the region of the joint is protected by means of a recoverable sleeve, which may have a tubular configuration, or alternatively, it may be in the form of a sheet which is wrapped around the joint and its ends secured together. Preferably, the sleeve is heat-recoverable; in their most common form, such sleeves are made from polymeric material exhibiting the property of elastic or plastic memory, as described for example in U.S. Pat. Nos. 2,027,962, 3,086,242 and 3,597,372. As it is made clear in, for example, U.S. Pat. No. 2,027,962, the original heat-stable form may be a transient form in a continuous process in which, for example, an extruded tube is expanded whilst hot to a dimensionally heat-unstable form, but in other applications, a preformed dimensionally heat-stable article is deformed to a dimensionally heat unstable form in a separate stage.

Preferably, the heat-recoverable sleeve is provided with a layer of sealing material, which may comprise an adhesive, for example a polyamide resin, a water-insoluble sealant such as a mastic, or both, on the surface which contacts the jointed elongate members. A suitable sleeve is described in British published Patent Application 2108625A.

A joint may be effected between any number of insulated elongate conduit members by appropriate choice of connecting collar. For example, if two such members are to be jointed, a collar with substantially uniform cross-section is appropriate, whereas if three members are to be jointed a 'T'-shaped, or a 'Y'-shaped collar would be used.

An assembly comprising an insulated elongate conduit member and a method of forming a connection thereto, each in accordance with the present invention, will now be described, by way of example only, with reference to the accompanying drawings, in which:

DESCRIPTION OF THE DRAWING

FIG. 1 is a section through one end of a thermally insulated pipe which constitutes the insulated elongate conduit member;

FIGS. 2A and 2B represent sections through a joint between two thermally insulated pipes, each according to FIG. 1 wherein the dotted line A—A divides the joint in half showing respectively the components before (FIG. 2A) and after (FIG. 2B) jointing of the pipes.

FIG. 3 is a section through a joint between three thermally insulated pipes, each according to FIG. 1; and

• FIG. 4 is a section through a joint between two thermally insulated pipes, using a deformable connecting member.

Referring to the drawings, FIG. 1 shows the end portion of an insulated pipe which may be a district heating pipe, in which a pipe 1 is insulated by a surrounding layer 2 of polyurethane foam, which is protected by an environmental sealing layer 3 of polyethylene. A length 4 of pipe 1, adjacent to the end 5 of the insulated pipe is left bare of insulation, such that there is an annular recess 6 around the pipe.

FIG. 2 shows stages in the jointing of two thermally insulated pipes, each according to FIG. 1, indicated respectively at 7 and 8. A first portion of a heat-recoverable connecting collar 9 comprising a nickel-titanium alloy which exhibits the property of memory, is slid into the annular recess 10, and surrounds the pipe 11 of one insulated pipe 7 while in its expanded, martensitic state. The axial length of the recess 10 is substantially equal to half the axial length of the unrecovered collar 9. The second insulated pipe 8 is brought into abutting contact with the first insulated pipe, such that a second portion of the expanded collar 9 is slid into the annular recess 12, and thus surrounds the pipe 13 of the second insulated pipe 8. The axial length of the recess 12 is substantially equal to half of the axial length of the unrecovered collar 9 so that the ends of the collar abut the insulation at the ends 16 of the annular recesses, 10 and 12. The collar 9 is recovered to its radially contracted, austenitic state by raising the temperature of the memory metal above −80° C. which is the transition temperature of the nickel-titanium alloy. In the austenitic state, the collar grips the pipes 11 and 13, and holds the insulating pipes 7 and 8, in abutting contact. A polymeric heat-recoverable wrap-around sleeve 14, provided with an internal layer of sealing material 15 is positioned around the joint, and heated, causing it to shrink and sealingly engage the outer surface of the jointed insulated pipes, 7 and 8.

FIG. 3 shows three thermally insulated pipes, indicated generally at 17, 18 and 19, jointed by means of a 'Y'-shaped, heat-recoverable collar 20. The joint is covered by a 'Y'-shaped heat-recoverable sleeve 21.

FIG. 4 shows a joint between two district heating pipes 40,42, which employs a deformable tubular connecting member 44. The member 44 is welded at a first end 45 to one of the pipes 40, and tapers outwardly towards its other end 46, towards which end it is provided with inwardly facing teeth 47. The insulation 48, around the pipe 40, is provided with an annular recess 50 around the end 46 of the connecting member 44 and the pipe 42 is arranged such that the end portion is left bare of thermal insulation.

The joint between pipes 40,42 is made by positioning a heat recoverable metal connecting collar 52 around the connecting member 44 within the recess 50, and then bringing the pipes 40,42 substantially into abuttment with the end portion of the pipe 42 within the connecting member 44. Subsequent recovery of the collar 52 deforms the member 44 so as to form a seal with the outer surface of pipe 42, the teeth 47 enhancing the seal. The resulting pipe joint is made water tight by means of a recoverable sleeve 54, coated with adhesive or mastic or preferably both.

In an alternative embodiment, the welded connecting member 44 may extend beyond the end of pipe 40, and pipe 42 may have an annular recess in the insulation around its end within which to receive the end 46 of the connecting member 44.

I claim:

1. A method of forming a connection between an elongate conduit member surrounded by insulating material which is provided with an annular recess extending radially and longitudinally along a section of the conduit member at one end thereof such that the insulating material surrounds but is radially spaced from the conduit member in that section and a second member, which method comprises (a) positioning said second member for connection to said end of said elongate conduit member; (b) locating a radially shrinkable tubular connecting collar at least partially within said recess so that it at least partially is surrounded by said insulating material positioned so that on shrinking, it connects the members; and (c) subsequently causing the connecting collar to shrink so that it connects said members.

2. A method as claimed in claim 1, further comprising the step of connecting the insulated elongate conduit member to a second insulated elongate conduit member.

3. A method as claimed in claim 1, wherein said shrinkable collar is recovered by increasing the temperature thereof.

4. A method as claimed in claim 1, wherein the elongate conduit members to be connected comprise polymeric material and the recoverable tubular collar comprises heat shrinkable polymeric material, the method including heating the collar to cause it to shrink into contact the conduit members, and then to cause fusion between the collar and the conduit member.

* * * * *

UNITED STATES PATENT AND TRADEMARK OFFICE
CERTIFICATE OF CORRECTION

PATENT NO. : 5,002,716
DATED : March 26, 1991
INVENTOR(S) : Frans S.J. Van Dijck It is certified that error appears in the above-indentified patent and that said Letters Patent is hereby corrected as shown below:

Column 4, line 4, replace "Mo. " by --no. --.

Column 8, line 3, claim 4, replace "recoverable" by --shrinkable --.

Signed and Sealed this

Twenty-second Day of March, 1994

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO.    : 5,002,716

INVENTOR(S)   : March 26, 1991

DATED         : Frans S.J. Van Dijck

It is certified that error appears in the above-identified patent and that said Letters Patent is hereby corrected as shown below:

```
    Column 2, line 30, replace "which at least one" by --which
at at least one--.
```

Signed and Sealed this

Ninth Day of August, 1994

Attest:

BRUCE LEHMAN

Attesting Officer

Commissioner of Patents and Trademarks